United States Patent
Chen

Patent Number: 6,065,038
Date of Patent: May 16, 2000

[54] METHOD AND APPARATUS FOR TRANSMITTING DATA AT DIFFERENT DATA TRANSFER RATES USING MULTIPLE INTERCONNECTED HUBS

[75] Inventor: Chia-Hsiou Chen, Hsinchu, Taiwan

[73] Assignee: Accton Technology Corp., Hsinchu, Taiwan

[21] Appl. No.: 09/019,866

[22] Filed: Feb. 6, 1998

[51] Int. Cl.[7] .................................................. G06F 15/16
[52] U.S. Cl. ........................ 709/200; 709/217; 709/218; 709/225; 709/232; 709/233; 709/246; 370/464; 370/60.1; 370/296; 370/252; 370/353; 370/436
[58] Field of Search .................................. 709/200, 217, 709/218, 225, 232, 233, 246; 370/464, 60.1, 296, 252, 353, 436, 431, 320, 236; 710/131

[56] References Cited

U.S. PATENT DOCUMENTS

| | | | |
|---|---|---|---|
| 5,058,110 | 10/1991 | Beach et al. ........................... | 370/464 |
| 5,557,606 | 9/1996 | Moon et al. ............................ | 370/296 |
| 5,561,669 | 10/1996 | Lenney et al. ......................... | 370/60.1 |
| 5,703,872 | 12/1997 | Boggs et al. ........................... | 370/252 |
| 5,841,990 | 11/1998 | Picazo, Jr. et al. .................... | 709/249 |
| 5,896,417 | 4/1999 | Lau ....................................... | 375/250 |
| 5,920,705 | 7/1999 | Lyon et al. ............................. | 370/409 |
| 5,991,885 | 11/1999 | Change et al. ......................... | 713/300 |

OTHER PUBLICATIONS

Computer Dictionary, Third Edition, Microsoft Press, 1997.

*Primary Examiner*—Frank J. Asta
*Assistant Examiner*—Beatriz Prieto
*Attorney, Agent, or Firm*—Berns Law Office, PC; Michael Berns

[57] ABSTRACT

A network hub which allows the transmission of data at varying data transfer rates. Data is divided into different transfer protocols and converted by an exchange unit to transform the data of different groups into appropriate speed networks.

8 Claims, 4 Drawing Sheets

METHOD AND APPARATUS FOR TRANSMITTING DATA AT DIFFERENT DATA TRANSFER RATES USING MULTIPLE INTERCONNECTED HUBS

FIELD OF THE INVENTION

This invention relates to an apparatus and method of network interface for transmitting and/or receiving data. More particularly, this invention relates to an improved hub for local area network connections which allows the transmission of data at varying data transfer rates.

DESCRIPTION OF THE PRIOR ART

A local area network (LAN) is a communication system that processes information between computers conveniently, fast, and allows useful cooperation between computer workstations. It enables personal computers, work stations, data terminals equipment, and other such information processing equipment to work with others. These local area networks are often located within an office or a building to transmit or receive data among various computers. Local area networks have become an increasingly popular and necessary tool in the use of computers, to allow transmission of a variety of information. As the use of local area networks has grown, several file transfer protocols have developed. Network administrators must have sufficient knowledge of the protocols to organize the network to prevent the occurrence of differing transport protocols, such as data transfer rates, from occurring at the local area network switching hub.

Currently, in order to achieve data transmission on a local area network at two different transfer rates, the use of a switching hub is required. FIG. 1 illustrates how this connection. Every computer has a network adapter in it to communicate to the network system. Current network adapters support two different fixed transfer protocols, such as 10 Mbps/100 Mbps for transferring data.

Network administrators must divide computer systems into groups, based upon the transport protocols used. For example, a low speed network of computers 10 supports 10 Mbps, and a high speed network of computers 13 supports 100 Mbps. Each of the two networks of computers must then connect to a hub. The low speed network of computers 10 would connect to a hub 11, and the high speed network of computers 13 would connect to a hub 15. The two hubs 11, 15 must then be connected to a local area network switching hub 17 to allow the interchange of data at differing transfer rates.

The hubs and switching hubs are expensive and need a professional manager to design, manage, and locate different hubs. This complexity and cost reduces the value of the network. A need exists for a single data transmission hub to provide a method of handling all data transport protocols.

SUMMARY OF THE INVENTION

It is therefore an object of the present invention to provide an improved hub device to be applied to all other data transport protocols, such that the aforementioned limitations and drawbacks in the prior art can be overcome. Specifically, it is an object of the present invention to provide an improved hub-connector which can divide the receiving data into different groups according to the transport protocols, and which uses an exchange unit to transform the data of different groups into appropriate speed connections. The network of the present invention needs only one connected port to transmit data to all protocols. This not only simplifies the network structure, but also reduces the cost.

It is also an object of the present invention to provide an improved hub device having a circuit control switch, network switches, and an exchange unit to interchange the incoming data. The network would not require several different traditional hubs. The network becomes more intuitive and easier for users to understand and accept.

BRIEF DESCRIPTION OF THE DRAWINGS

The present invention will be more fully understood by reference to the following detailed description thereof when read in conjunction with the attached drawings, and wherein.

REFERENCE NUMERALS IN THE DRAWINGS

Figure 1:
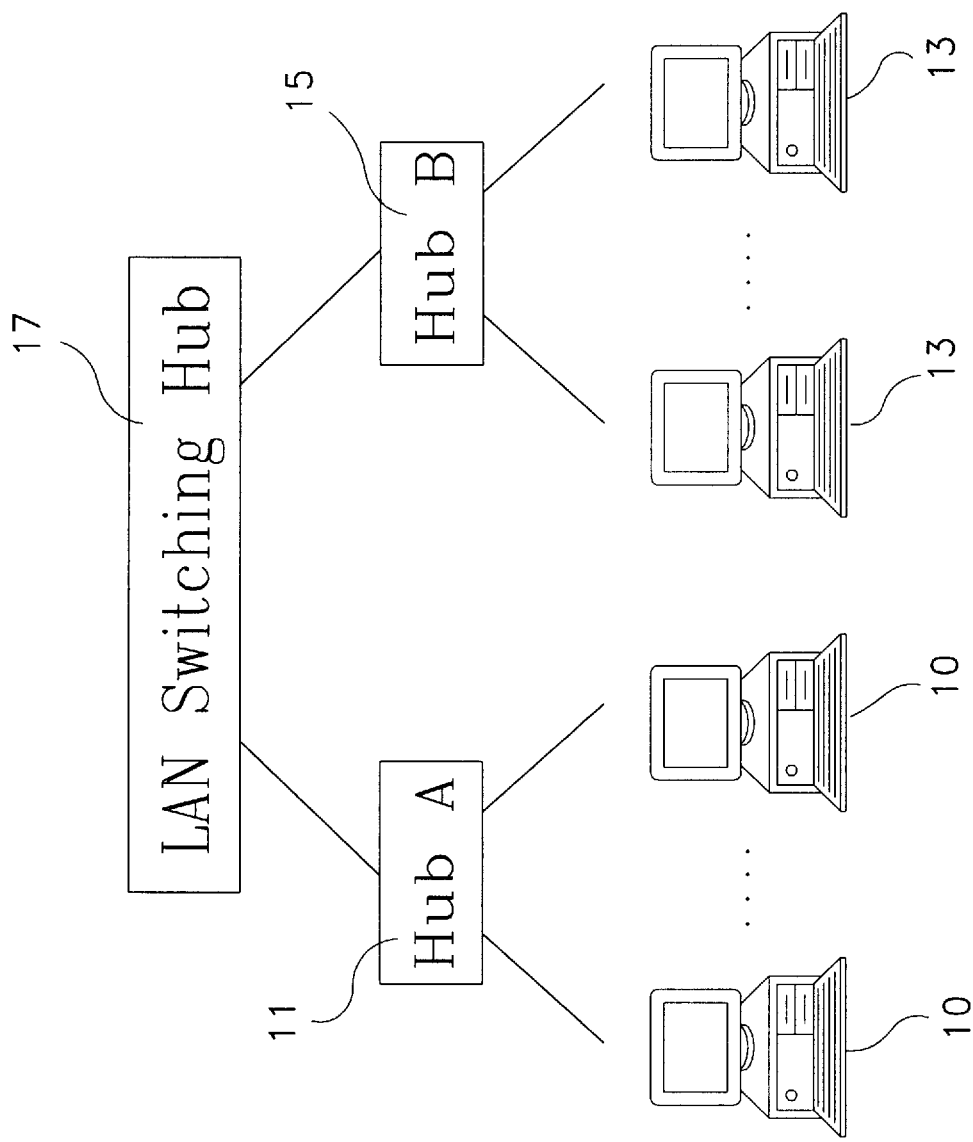
FIG. 1 is a block diagram illustrating data transmission at two differing transport protocols applying the typical prior art method of local area networks.

10. Low speed computer
11. Low speed hub
13. High speed computer
15. High speed hub
17. Switching hub
20. Speed Detection Unit
21. Data connection port
23. Switches
25. Circuit control switch
27. Filter
30. First speed hub unit
31. Transport layer
33. Physical layer
35. First speed hub application layer
40. Second speed hub unit
41. Transport layer
43. Physical layer
45. Second speed hub application layer
50. Exchanged unit
601. Detection of transport protocol
603. Transport layer receiving data
605. Application layer receiving data
607. Interchanging and transforming the data
611. Switching to the second hub unit
613. Transport layer receiving data
615. Application layer receiving data

DETAILED DESCRIPTION OF THE PREFERRED EMBODIMENT

Figure 2:
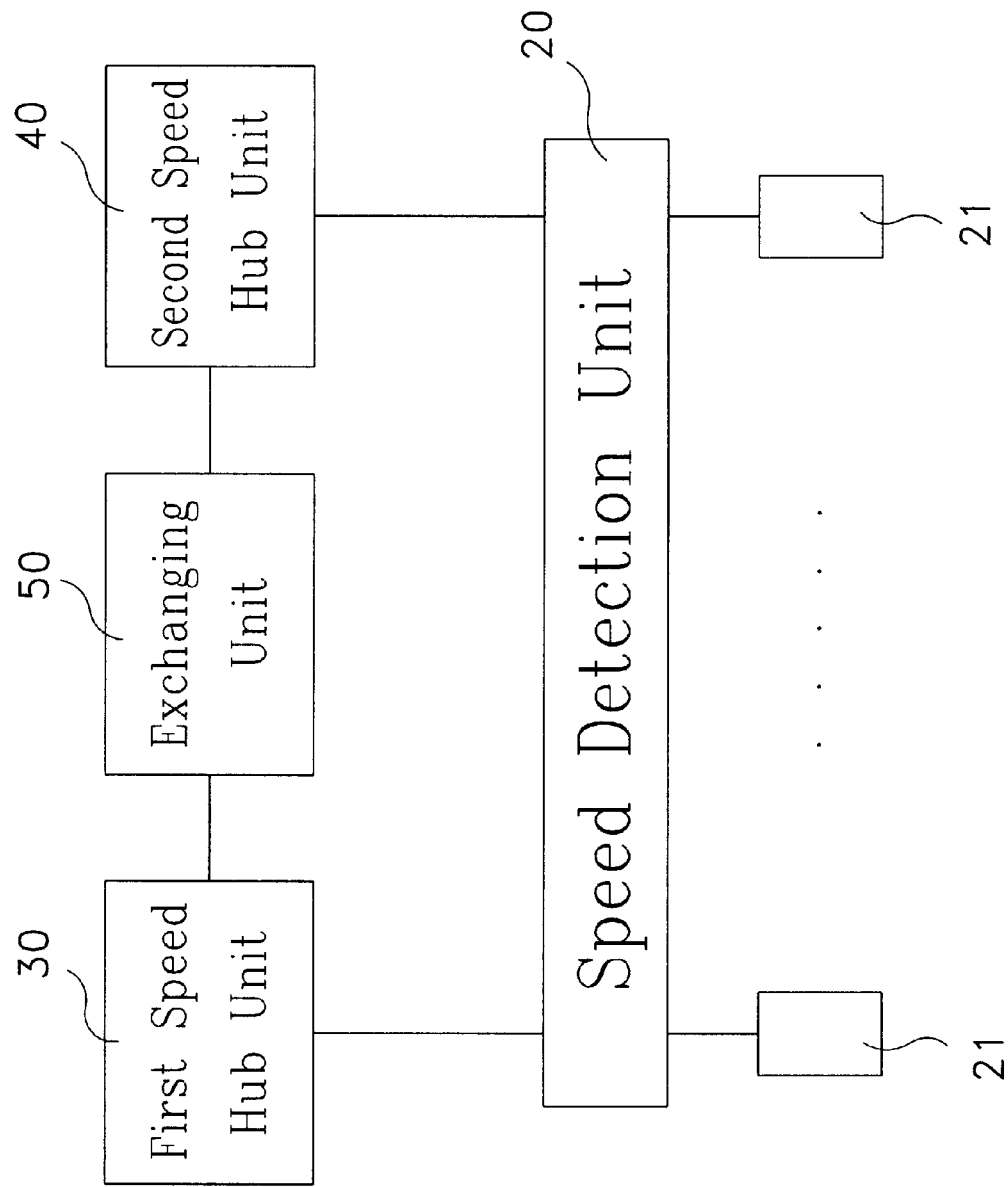
FIG. 2 is a block diagram of the hub device according to the present invention.

An embodiment of the present invention showing the main structure of the hub device is illustrated in FIG. 2. The network hub includes a speed detection unit 20, a first speed hub unit 30, a second speed hub unit 40, and an exchange unit 50. The speed detection unit 20 is connected to a plurality of data connected ports 21 that are coupled to a network adapter of a personal computer, a workstation, data terminal equipment, or similar use, by means of transmission lines. The sped detection unit 20 can automatically detect the transport protocol of each transmitting data and receiving data, and divide them into the first speed hub unit 30 or the second speed hub unit 40. The first speed hub unit 30 and the second speed hub unit 40 are similar to traditional hubs, but an exchange unit 50 between them transforms the data from the first peed hub unit 30 or the second speed hub unit 40 into differing transport protocols, and the data can be transmitted by the other hub to the network.

Figure 3:
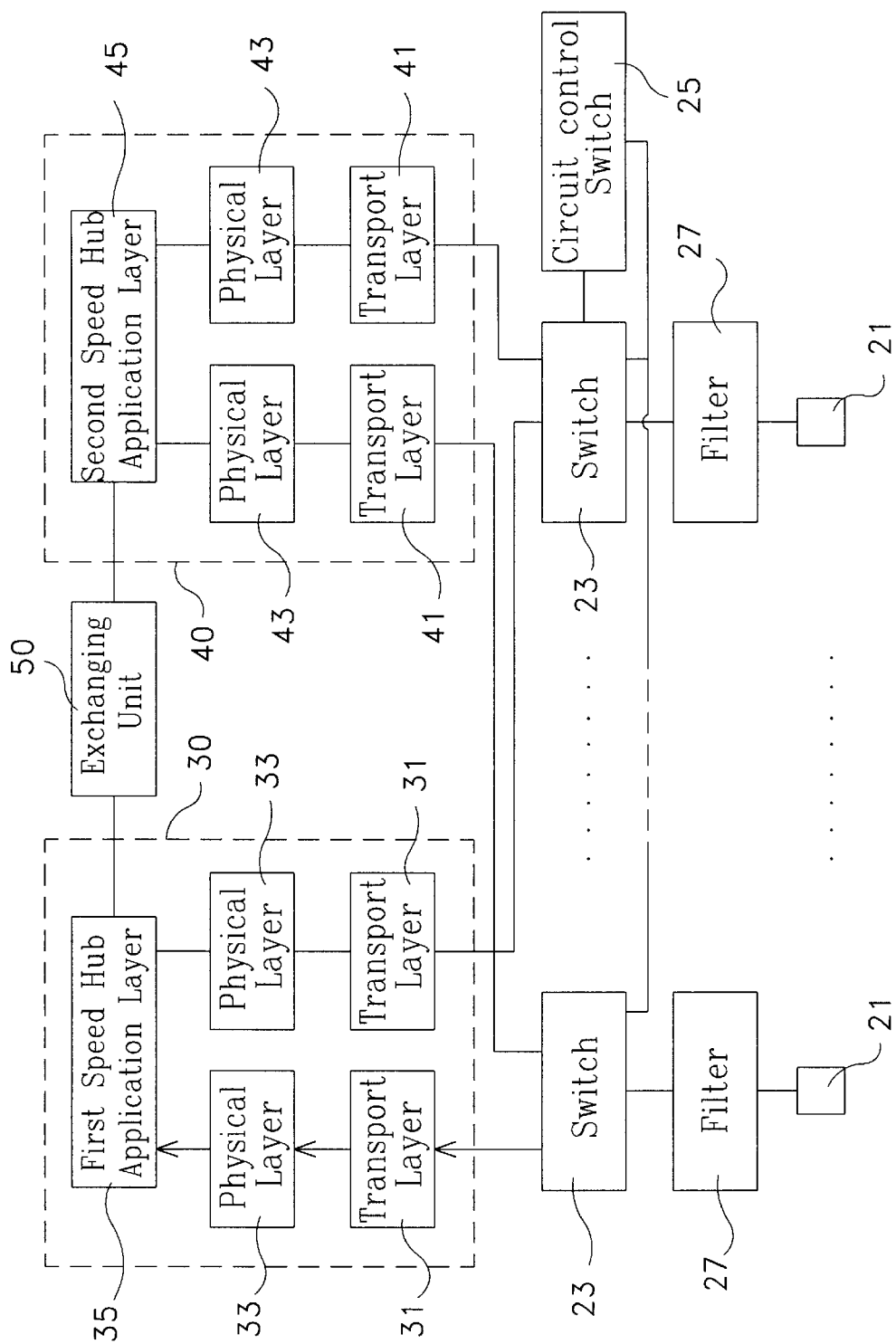
FIG. 3 is a block diagram of a more detailed structure of the hub device shown in FIG. 2.

Referring to FIG. 3, the speed detection unit 20 primarily includes a plurality of switches 23 and a circuit control switch 25. Each switch 23 is individually connected to the matched data connected port 21, and the circuit control switch 25 is connected to each switch 23 to detect the transport protocol of the transmitting or receiving data and then divide the data signal to the first speed hub unit 30 or the second speed hub unit 40. A plurality of switches 23 are provided to connect to the first speed hub unit 30 or the second speed hub unit 40, so there are a plurality of transport layers 31, physical layers 33, and a first speed hub application layer 35 in each first speed hub unit 30, and there are a plurality of transport layers 41, physical layers 43 and a second speed hub application layer 45 in each second speed hub unit 40. Each transport layer 31, 41 is individually connected to the switch 23, receiving the data from the data connected port 21, and is connected to a physical layer 33 or 43. Each physical layer 33, 43 is individually connected to the first speed application layer 45. If the destination of data transmission is of the same transport protocol, the data will go through the physical layer 33, 43, the transport layer 31,41 the switch 23 the connected port 21, and finally to the network adapter of the other computer system. Conversely, if the destination of data transmission is of the different transport protocol, the data will go through the first speed hub application layer 35, the exchange unit 50, and the second speed hub application layer 45 to transform to each other, and then the data will arrive at the destination with appropriate transport speed and transport protocol.

In one of the preferred embodiments, there is a filter 27 between the data connected port 21 and the switch 23 or between the switch 23 and the transport layer 31,41 to avoid having noises interfere with the data transmitted by the hub device. The structure mentioned above is commonly applied to Ethernet connections. The first speed hub unit 30 often supports 10 Mbps and the second hub unit 40 often supports 100 Mbps. The speeds may vary depending on the users requirements.

Figure 4:
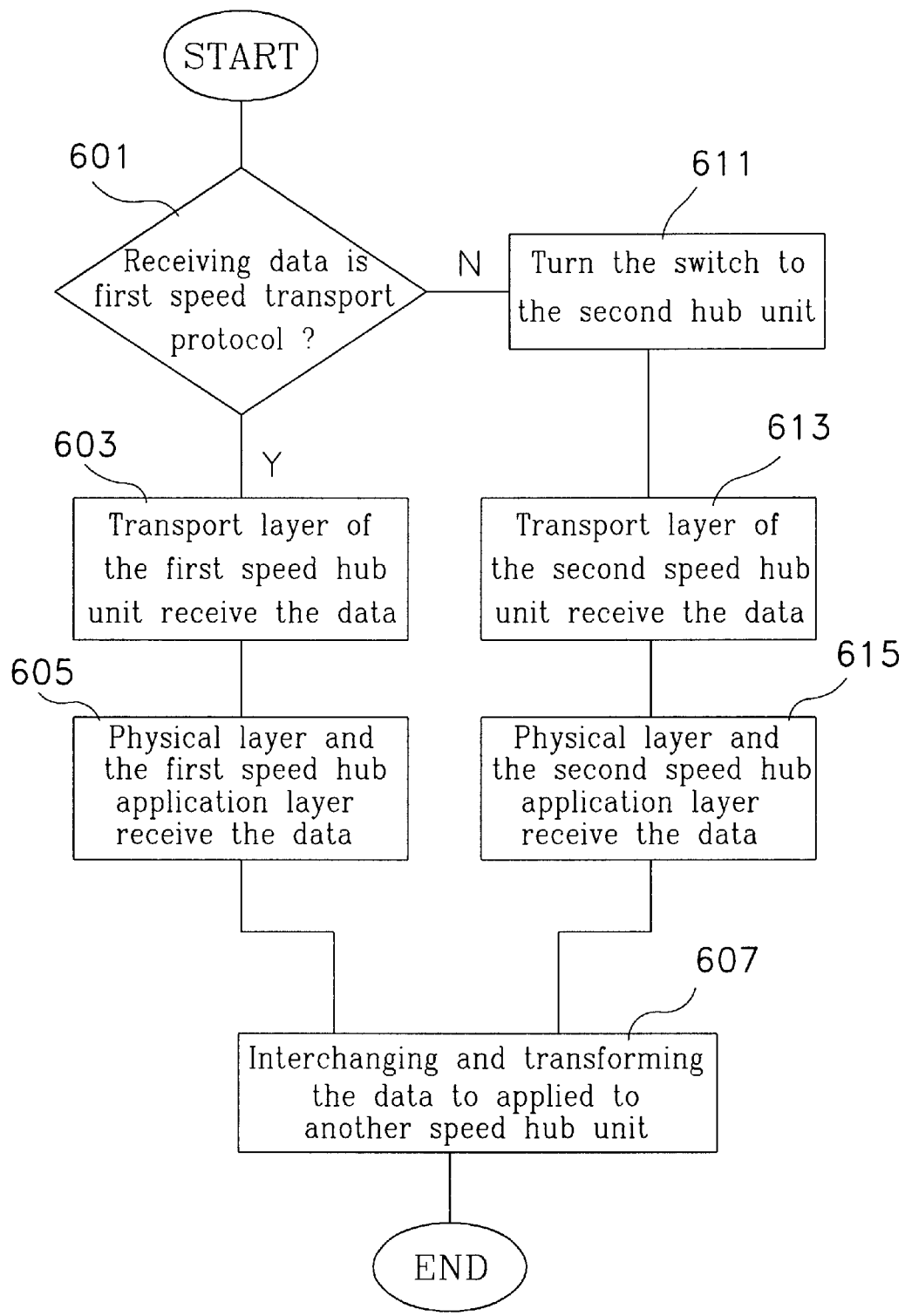
FIG. 4 is an operational flowchart of the data transmission of the hub device according to the present invention.

FIG. 4 shows the operational flowchart of the data transmission of the preferred embodiment including the steps of:

601: The circuit control switch detects the transport protocol of the receiving data. If the transport protocol is the first speed transmission, then step 603 is run. If the transport protocol is not first speed transmission, step 611 is run.

603: The transmitting data can pass through the switch immediately to the transport layer of first speed

605: The process of receiving data has finished after each data passes through the physical layer and the first speed hub application layer. The process then proceeds to the following step 607

611: The circuit control switch should turn to the second hub unit after the circuit control switch detected the data is assuming the second speed transport protocol.

613: The transmitting data can pass through the switch to the transport layer of the second hub unit because the switch has chosen to be of a second speed transport protocol.

615: The process of receiving data has finished after each data passes through the physical layer and the second speed hub application layer, and then proceeding with the following step 607.

607: Because the data needs interchanging and transforming to be applied to another speed hub unit and transport protocol, the data will connect to the exchange unit, and then transmitted in the network.

The hub device of the present invention has a circuit control switch which can automatically detect the transport protocol or the transmitting speed of data, and the exchange unit can interchange or transform the data to be applied to another transport protocol, so the present invention can use only one hub to give the function of several traditional hubs and exchanged hubs.

It is not desired to limit the invention to the exact construction and operation shown and described, and accordingly all suitable modifications and equivalents may be resorted to, falling within the scope of the invention as claimed.

What is claimed is:

1. A network hub for connecting a plurality of computer systems through a plurality of network adapters respectively for transmitting data thereinbetween, at least one of said plurality of network adapters transmitting data in a first transfer rate and at least one of said plurality of network adapters transmitting data in a second transfer rate, said network hub comprising:

a speed detection unit having a plurality of data connection ports for being connected thereon said plurality of network adapters for identifying transfer rates of transmitting data inputted from said network adapters;

a first speed hub unit connected to said speed detection unit for receiving transmitting data identified by said speed detection unit as being transmitted at said first transfer rate;

a second speed hub unit connected to said speed detection unit for receiving transmitting data identified by said speed detection unit as being transferred at said second transfer rate; and an exchange unit connected to said first speed hub unit and said second speed hub unit respectively for transforming said data to be of appropriate transport protocol.

2. The network hub as defined in claim 1, wherein said speed detection unit comprises a plurality of data connection ports which individually connected to a plurality of switches and said network adapter of said computer system, said switched are connected to a circuit control switch which can detect the transport protocol of said data automatically.

3. The network hub as defined in claim 1, wherein said first speed hub unit comprises as least one transport layer, at least one physical layer, and a first speed hub application layer, said transport layer is connected to said matched switch and said physical layer individually, and said physical layer is connected to said exchange unit through said first speed hub application layer.

4. The network hub as defined in claim 1, wherein said second speed hub unit comprises at least one transport layer, at least one physical layer, and a second hub application layer, said transport layer is connected to said matched switch and said physical layer individually, and said physical layer is connected to said exchange unit through said second speed hub application layer.

5. The network hub as defined in claim 2, wherein said speed detection unit further comprises a plurality of filters which are connected between said matched data connection port and said switch.

6. The network hub as defined in claim 2, wherein said speed detection unit further comprises a plurality of filters that are connected between said matched switch and said transport layer of said first speed hub and second speed hub units.

7. The network hub as defined in claim 1, wherein said first speed hub unit is applied to 10 Mbps, and said second speed hub unit is applied to 100 Mbps.

8. A method for transmitting data between computer systems applied at different data transfer rates; comprising the steps of:

providing a speed detection unit for receiving data from said computer systems and identifying the transfer rate of said data;

transmitting said data into a first speed hub unit when said data is at a first data transfer rate, and transmitting said data into a second speed hub unit when said data is at a second data transfer rate; and providing an exchange unit to transform and interchange said data between said first speed hub unit and said second speed hub unit.

\* \* \* \* \*